(12) United States Patent
Herle et al.

(10) Patent No.: US 9,350,710 B2
(45) Date of Patent: May 24, 2016

(54) INTELLIGENT, CLOUD-BASED GLOBAL VIRTUAL PRIVATE NETWORK SYSTEMS AND METHODS

(71) Applicants: Sudhindra P. Herle, Dallas, TX (US); Patrick Foxhoven, San Jose, CA (US)

(72) Inventors: Sudhindra P. Herle, Dallas, TX (US); Patrick Foxhoven, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 42 days.

(21) Appl. No.: 14/310,348

(22) Filed: Jun. 20, 2014

(65) Prior Publication Data

US 2015/0372982 A1 Dec. 24, 2015

(51) Int. Cl.
*G06F 9/00* (2006.01)
*G06F 15/16* (2006.01)
*G06F 17/00* (2006.01)
*H04L 29/06* (2006.01)

(52) U.S. Cl.
CPC ............ *H04L 63/0272* (2013.01); *H04L 63/08* (2013.01)

(58) Field of Classification Search
CPC . H04L 63/0274; H04L 12/4641; H04L 63/20; H04L 12/4633; H04L 63/08
USPC .......................................................... 726/15
See application file for complete search history.

(56) References Cited

U.S. PATENT DOCUMENTS

| | | | |
|---|---|---|---|
| 2006/0074618 A1* | 4/2006 | Miller ................. | G06F 9/45504 703/13 |
| 2007/0042756 A1* | 2/2007 | Perfetto ............ | H04M 3/42263 455/412.1 |
| 2008/0307519 A1* | 12/2008 | Curcio ................ | H04L 63/0227 726/15 |
| 2009/0129271 A1* | 5/2009 | Ramankutty ........... | H04L 12/66 370/235 |
| 2012/0023325 A1* | 1/2012 | Lai .......................... | H04L 63/08 713/155 |
| 2012/0281708 A1* | 11/2012 | Chauhan ............. | H04L 63/0272 370/401 |

OTHER PUBLICATIONS

J. R. Vic Winkler; Securing the Cloud: Cloud Computer Security Techniques and Tactics; May 2011; Syngress Publishing; Full Text.*
Stephen R. Smoot; Private Cloud Computing: Consolidation, Virtualization, and Service-Oriented Infrastructure; Oct. 2011; Morgan Kaufman Publishers, Inc. Full Text.*

* cited by examiner

*Primary Examiner* — Kambiz Zand
*Assistant Examiner* — Stephen Sanders
(74) *Attorney, Agent, or Firm* — Clements Bernard PLLC; Lawrence A. Baratta, Jr.; Christopher L. Bernard

(57) ABSTRACT

A method includes connecting to a client at a Virtual Private Network (VPN) device in a cloud system; forwarding requests from the client for the Internet or public clouds accordingly; and, for requests for an enterprise associated with the client, contacting a topology controller to fetch a topology of the enterprise, causing a tunnel to be established from the enterprise to the VPN device, and forwarding the requests for the enterprise through the tunnel. A cloud system and VPN system are also described. Advantageously, connections between the cloud and on-premises proxy are dynamic, on-demand and orchestrated by the cloud. Security is provided at the edge—there is no need to punch any holes in the existing on-premises firewalls.

18 Claims, 4 Drawing Sheets

INTELLIGENT, CLOUD-BASED GLOBAL VIRTUAL PRIVATE NETWORK SYSTEMS AND METHODS

FIELD OF THE DISCLOSURE

The present disclosure relates generally to computer networking systems and methods. More particularly, the present disclosure relates to systems and methods for an intelligent, cloud-based global Virtual Private Network (VPN).

BACKGROUND OF THE DISCLOSURE

Conventionally, Information Technology (IT) departments and the like see data and computing assets in three possible domains, namely (1) internal networks, (2) private clouds, and (3) public clouds or Software-as-a-Service (SaaS). As computing moves to the cloud, users may access internal data such as through database applications, etc. through a VPN, access their own documents via a public cloud (e.g., Microsoft OneDrive, Google Drive, Dropbox, Apple iCloud, etc.), etc. This distribution of data and computing assets makes it very difficult for an enterprise user to connect seamlessly to applications ("apps") in these domains (without regard to their topology/connectivity/location), and, for the IT administrator, it is difficult to enforce a single, coherent set of policies across these three domains. Note, that the enterprise users can be nomadic in nature or be situated in untrusted branch offices. The current state of the art requires the IT admin to hairpin all end-user traffic back to the corporate data center via a traditional VPN (e.g., Secure Sockets Layer (SSL) or Internet Protocol Security (IPsec))—and then jump to the other domains via point-to-point dedicated VPNs. This approach increases the incoming and outgoing bandwidth to the corporate data center linearly with every new branch or nomadic user. This increase in traffic is completely un-necessary—since most of the inbound VPN traffic will go out through a dedicated VPN to the private cloud.

A second alternative is to install a Firewall & VPN server in every private cloud and setup application routing rules—so that apps can talk between the domains and across multiple private cloud instances. Disadvantageously, this greatly increases administrative complexity and adds multiple points of security weakness. Thus, there is a need in the market for a "Global VPN" that leverages the cloud to maintain a single secure VPN to the cloud—and direct traffic to various enterprises assets per authentication and security policies—and in particular, provide a safe path from the cloud back to enterprise data center.

BRIEF SUMMARY OF THE DISCLOSURE

In an exemplary embodiment, a method includes connecting to a client at a Virtual Private Network (VPN) device in a cloud system; forwarding requests from the client for the Internet or public clouds accordingly; and for requests for an enterprise associated with the client, contacting a topology controller to fetch a topology of the enterprise, causing a tunnel to be established from the enterprise to the VPN device, and forwarding the requests for the enterprise through the tunnel. The method can further include authenticating, via an authentication server, the client prior to the connecting and associating the client with the enterprise. The method can further include, subsequent to the connecting, setting a Domain Name Server (DNS) associated with the cloud system to provide DNS lookups for the client. The method can further include utilizing the DNS to determine a destination of the requests; and for the requests for the enterprise, contacting the topology controller to pre-fetch the topology of the enterprise. The method can further include operating an on-premises redirection proxy within the enterprise, wherein the on-premises redirection proxy is configured to establish the tunnel from the enterprise to the VPN device. Secure tunnels to the enterprise are dialed out from the enterprise by the on-premises redirection proxy. The on-premises redirection proxy is a virtual machine operating behind a firewall associated with the enterprise. The on-premises redirection proxy is configured as a bridge between the client and applications inside the enterprise. The VPN device operates on a cloud node in the cloud system, and wherein the cloud system includes a distributed security cloud. The VPN device can include one of a software instance on a cloud node or a virtual machine on the cloud node. The topology controller includes a network topology of the enterprise including internal domain names and subnets.

In another exemplary embodiment, a cloud system includes one or more Virtual Private Network (VPN) servers, wherein one or more clients connect securely to the one or more VPN servers; a topology controller communicatively coupled to the one or more VPN servers; a Domain Name Server (DNS) communicatively coupled to the topology controller and the one or more VPN servers; and a redirection proxy located in a private network and communicatively coupled to the one or more VPN servers and the topology controller; wherein requests from the one or more clients to the private network cause on demand secure connections being established by the redirection proxy to associated VPN servers. Requests from the one or more clients outside of the private network are forwarded without traversing the private network. The redirection proxy maintains a persistent connection to the topology controller and establishes secure tunnels to the one or more VPN servers based on direction from the topology controller. The topology controller includes a network topology of the private network including internal domain names and subnets. The VPN servers operate on cloud nodes in a distributed security cloud.

In yet another exemplary embodiment, a VPN system includes a network interface, a data store, and a processor, each communicatively coupled together; and memory storing instructions that, when executed, cause the processor to: establish a secure tunnel with a client; forward requests from the client to the Internet accordingly; and for requests to an enterprise, contact a topology controller to fetch a topology of the enterprise, cause a tunnel to be established from the enterprise to the VPN system, and forwarding the requests for the enterprise through the tunnel and the secure tunnel. The memory storing instructions that, when executed, further cause the processor to: cause the tunnel to be established from the enterprise to the VPN system through an on premises redirection proxy located within the enterprise.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods for an intelligent, cloud-based global VPN are described. At a high level, the systems and methods dynamically creates a connection through a secure tunnel between three entities: an end-point, a cloud, and an on-premises redirection proxy. The connection between the cloud and on-premises proxy is dynamic, on-demand and orchestrated by the cloud. A key feature of the systems and methods is its security at the edge—there is no need to punch any holes in the existing on-premises firewall. The redirection proxy inside the enterprise (on premises) "dials out" and connects to the cloud as if too were an end-point. This on-demand dial-out capability and tunneling authenticated traffic back to the enterprise is a key differentiator of the systems and methods.

Exemplary Cloud System Architecture

Figure 1:
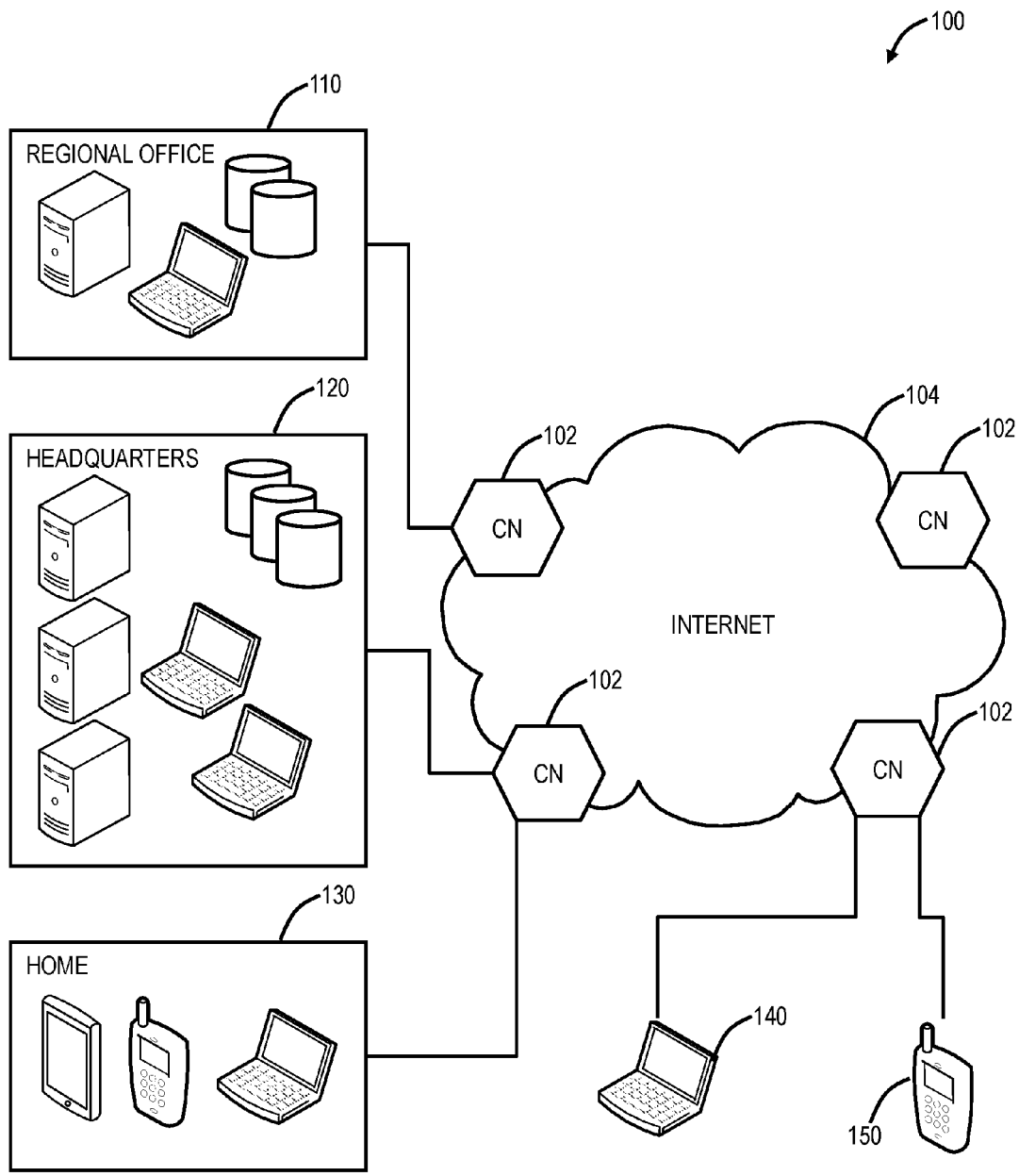
FIG. 1 is network diagram of a cloud system for use with the systems and methods described herein.
Figure 2:
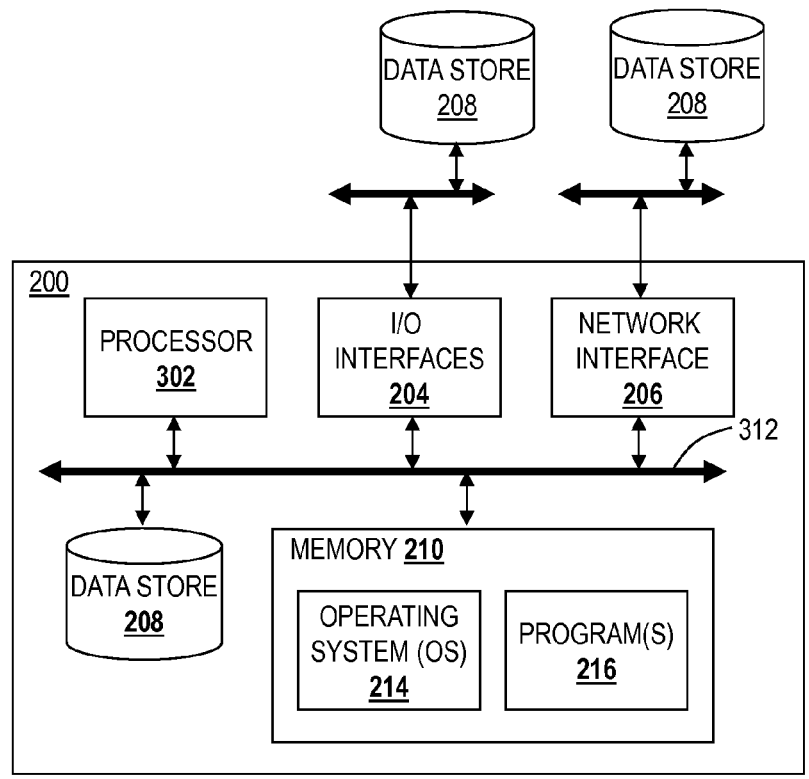
FIG. 2 is a block diagram of a server which may be used in the cloud system of FIG. 1 or standalone.

Referring to FIG. 1, in an exemplary embodiment, a cloud system 100 is illustrated for use with the systems and methods described herein. The cloud system 100 includes one or more cloud nodes (CN) 102 communicatively coupled to the Internet 104. The cloud nodes 102 may be implemented as a server 200 (as illustrated in FIG. 2), or the like. That is, the cloud system 100 may be a distributed security system. In the cloud system 100, traffic from various locations (and various devices located therein) such as a regional office 110, headquarters 120, various employee's homes 130, mobile laptop 140, and mobile device 150 can be monitored or redirected to the cloud through the cloud nodes 102. That is, each of the locations 110, 120, 130, 140, 150 is communicatively coupled to the Internet 104 and can be monitored by the cloud nodes 102. The cloud system 100 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 100 may be viewed as Security-as-a-Service through the cloud. Existing cloud-based distributed security systems perform inline processing where all traffic is redirected through the cloud for proactive monitoring. In the various exemplary embodiments described herein, DNS is utilized for a less intrusive mechanism for a cloud-based distributed security system.

In an exemplary embodiment, the cloud system 100 can be configured to provide mobile device security and policy systems and methods. The mobile device 150 may be the mobile device 300, and may include common devices such as smartphones, laptops, tablets, netbooks, ultra-books, personal digital assistants, MP3 players, cell phones, e-book readers, and the like. The cloud system 100 is configured to provide security and policy enforcement for devices including the mobile devices 150 in the cloud. Advantageously, the cloud system 100 avoids platform specific security apps on the mobile devices 150, forwards web traffic through the cloud system 100, enables network administrators to define policies in the cloud, and enforces/cleans traffic in the cloud prior to delivery to the mobile devices 150. Further, through the cloud system 100, network administrators may define user centric policies tied to users, not devices, with the policies being applied regardless of the device used by the user. The cloud system 100 provides 24×7 security with no need for updates as the cloud system 100 is always up-to-date with current threats and without requiring device signature updates. Also, the cloud system 100 enables multiple enforcement points, centralized provisioning and logging, automatic traffic routing to a nearest cloud node 102, geographical distribution of the cloud nodes 102, policy shadowing of users which is dynamically available at the cloud nodes, etc.

Generally, the cloud system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud system 100 is illustrated herein as one exemplary embodiment of a cloud-based system, and those of ordinary skill in the art will recognize the systems and methods contemplate operation on any cloud based system.

Exemplary Server Architecture

Referring to FIG. 2, in an exemplary embodiment, a block diagram illustrates a server 200 which may be used in the system 100, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Figure 3:
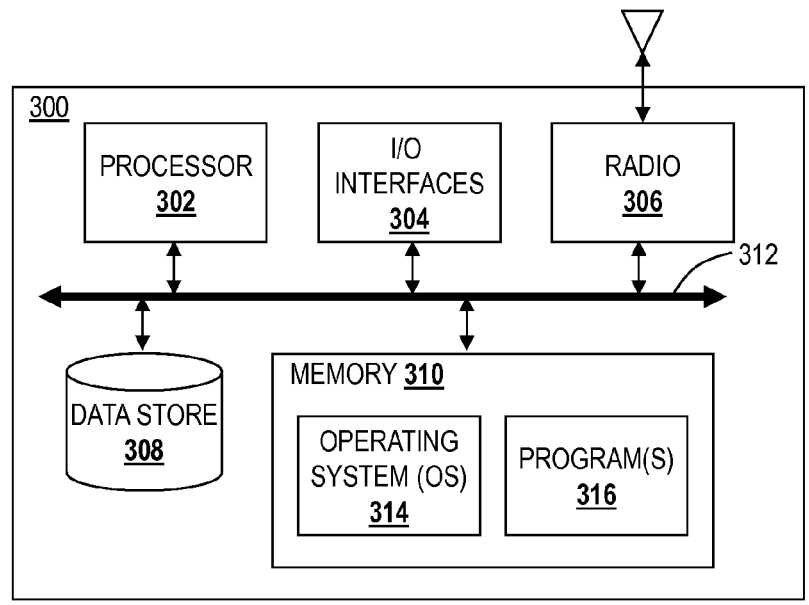
FIG. 3 is a block diagram of a mobile device which may be used in the cloud system of FIG. 1 or with any other cloud-based system.

Referring to FIG. 3, in an exemplary embodiment, a block diagram illustrates a mobile device 300, which may be used in the system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the memory 310, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the memory 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network.

VPN Architecture

Figure 4:
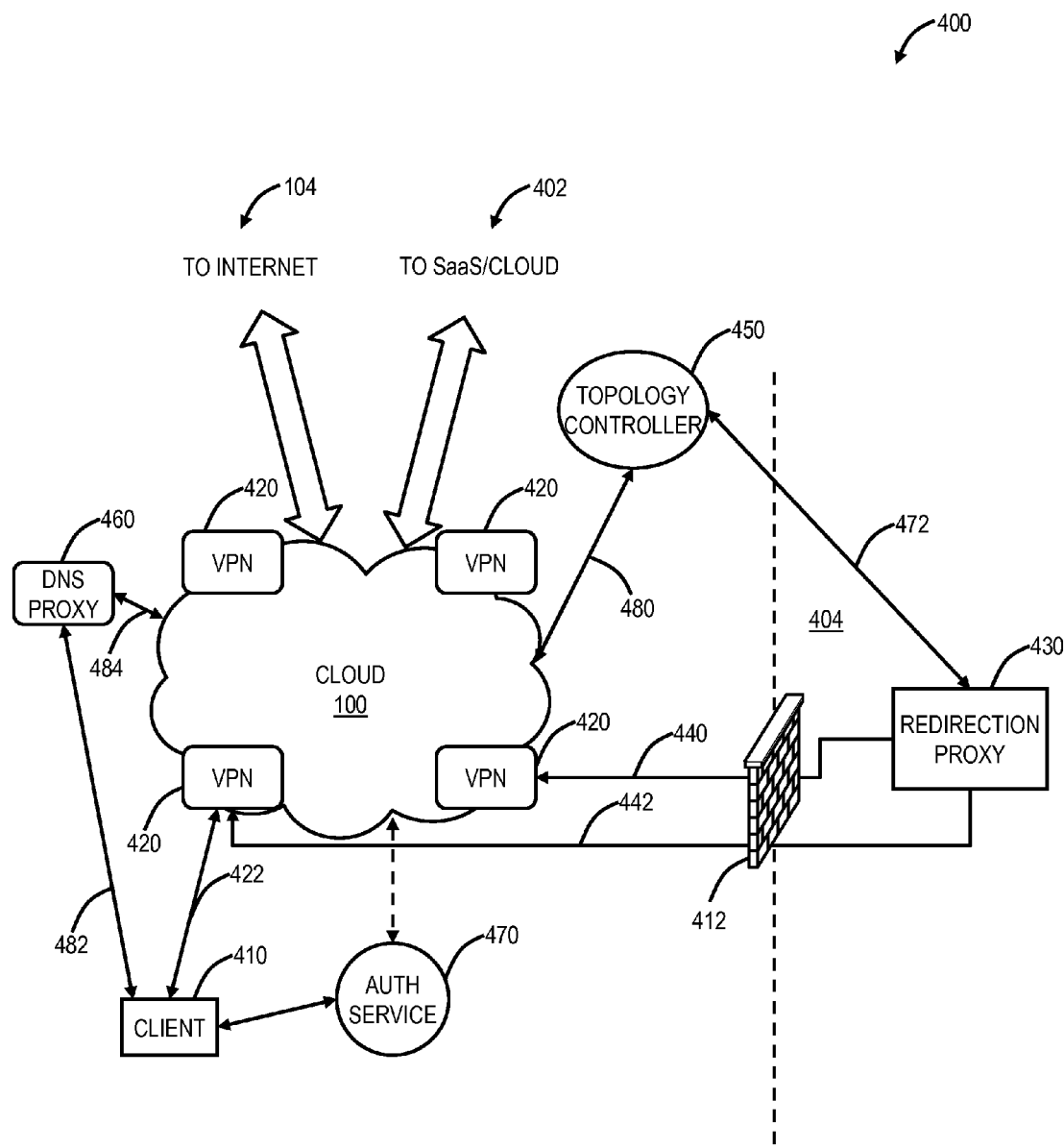
FIG. 4 is a network diagram of a VPN architecture for an intelligent, cloud-based global VPN.

Referring to FIG. 4, in an exemplary embodiment, a network diagram illustrates a VPN architecture 400 for an intelligent, cloud-based global VPN. For illustration purposes, the VPN architecture 400 includes the cloud system 100, the Internet 104, SaaS/public cloud systems 402, and an enterprise 404. The VPN architecture 400 also includes a client 410 which can include any computing device/platform connecting to the cloud system 100, the Internet 104, the SaaS/public cloud systems 402, and the enterprise 404. The VPN architecture 400 includes a single client for illustration purposes, but those of ordinary skill in the art will recognize that the VPN architecture 400 contemplates a plurality of client devices. The client 410 can be a nomadic user, a regional/branch office, etc. That is, the client 410 can be any user of the enterprise 404 that is physically located outside a firewall 412 associated with the enterprise 404. The SaaS/public cloud systems 402 can include any systems containing computing and data assets in the cloud such as, for example, Microsoft OneDrive, Google Drive, Dropbox, Apple iCloud, Customer Relationship Management (CRM) systems, Sales management systems, etc. The enterprise 404 includes local computing and data assets behind the firewall 412 for additional security on highly confidential assets or legacy assets not yet migrated to the cloud.

The client 410 needs to access the Internet 104, the SaaS/public cloud systems 402, and the enterprise 404. Again, conventionally, the solution for secure communication, the client 410 has a VPN connection through the firewall 412 where all data is sent to the enterprise 404 including data destined for the Internet 104 or the SaaS/public cloud systems 402. Furthermore, this VPN connection dials into the enterprise 404. The systems and methods described herein provide the VPN architecture 400 which provides a secure connection to the enterprise 404 without bringing all traffic, e.g., traffic for the Internet 104 or the SaaS/public cloud systems 402, into the enterprise 404 as well as removing the requirement for the client 410 to dial into the enterprise 404.

Instead of the client 410 creating a secure connection through the firewall 412, the client 410 connects securely to a VPN device 420 located in the cloud system 100 through a secure connection 422. Note, the cloud system 100 can include a plurality of VPN devices 420. The VPN architecture 400 dynamically routes traffic between the client 410 and the Internet 104, the SaaS/public cloud systems 402, and securely with the enterprise 404. For secure access to the enterprise 404, the VPN architecture 400 includes dynamically creating connections through secure tunnels between three entities: the VPN device 420, the cloud, and an on-premises redirection proxy 430. The connection between the cloud system 100 and the on-premises redirection proxy 430 is dynamic, on-demand and orchestrated by the cloud system 100. A key feature of the systems and methods is its security at the edge of the cloud system 100—there is no need to punch any holes in the existing on-premises firewall 412. The on-premises redirection proxy 430 inside the enterprise 404 "dials out" and connects to the cloud system 100 as if too were an endpoint via secure connections 440, 442. This on-demand dial-out capability and tunneling authenticated traffic back to the enterprise 404 is a key differentiator.

The VPN architecture 400 includes the VPN devices 420, the on-premises redirection proxy 430, a topology controller 450, and an intelligent DNS proxy 460. The VPN devices 420 can be Traffic (VPN) distribution servers and can be part of the cloud system 100. In an exemplary embodiment, the cloud system 100 can be a security cloud such as available from Zscaler, Inc. (www.zscaler.com) performing functions on behalf of every client that connects to it: a) allowing/denying access to specific Internet sites/apps—based on security policy and absence/presence of malware in those sites, and b) set policies on specific SaaS apps and allowing/denying access to specific employees or groups.

The on-premises redirection proxy 430 is located inside a perimeter of the enterprise 404 (inside the private cloud or inside the corporate data center—depending on the deployment topology). It is connected to a local network and acts as a "bridge" between the clients 410 outside the perimeter and apps that are inside the perimeter through the secure connections 440, 442. But, this "bridge" is always closed—it is only open to the clients 410 that pass two criteria: a) they must be authenticated by an enterprise authentication service 470, and b) the security policy in effect allows them access to "cross the bridge".

When the on-premises redirection proxy 430 starts, it establishes a persistent, long-lived connection 472 to the topology controller 450. The topology controller 450 connects to the on-premises redirection proxy 430 through a secure connection 472 and to the cloud system 100 through a secure connection 480. The on-premises redirection proxy 430 waits for instruction from the topology controller 450 to establish tunnels to specific VPN termination nodes, i.e., the VPN devices 420, in the cloud system 100. The on-premises redirection proxy 430 is most expediently realized as custom software running inside a virtual machine (VM). The topology controller 450, as part of the non-volatile data for each enterprise, stores the network topology of a private network of the enterprise 404 including, but not limited to, internal domain name(s), subnet(s) and other routing information.

The DNS proxy 460 handles all domain name to Internet Protocol (IP) Address resolution on behalf of end points (clients). These end points are end user computing devices—such as a mobile devices, laptops, tablets, etc. The DNS proxy 460 consults the topology controller 450 to discern packets that must be sent to the Internet 104, the SaaS/public cloud systems 402, vs. the enterprise 404 private network. This decision is made by consulting the topology controller 450 for information about a company's private network and domains. The DNS proxy 460 is connected to the client 410 through a connection 482 and to the cloud system 100 through a connection 484.

The VPN device 420 is located in the cloud system 100 and can have multiple points-of-presence around the world. If the cloud system 100 is a distributed security cloud, the VPN device 420 can be located with enforcement nodes. In general, the VPN device 420 can be implemented as software instances on the cloud nodes 102, as a separate virtual machine on the same physical hardware as the cloud nodes 102, or a separate hardware device such as the server 200, but part of the cloud system 100. The VPN device 420 is the first point of entry for any client wishing to connect to the Internet 104, SaaS apps, or the enterprise private network. In addition to doing traditional functions of a VPN server, the VPN device 420 works in concert with the topology controller 450 to establish on-demand routes to the on-premises redirection proxy 430. These routes are setup for each user on demand. When the VPN device 420 determines that a packet from the client 410 is destined for the enterprise private network, it encapsulates the packet and sends it via a tunnel between the VPN device 420 and the on-premises redirection proxy 430. For packets meant for the Internet 104 or SaaS clouds, the VPN device 420 can forwards it to the existing Enforcement Nodes (EN) such as the cloud nodes 102—to continue processing as before, or send directly to the Internet 104 or SaaS clouds.

VPN Method

Figure 5:
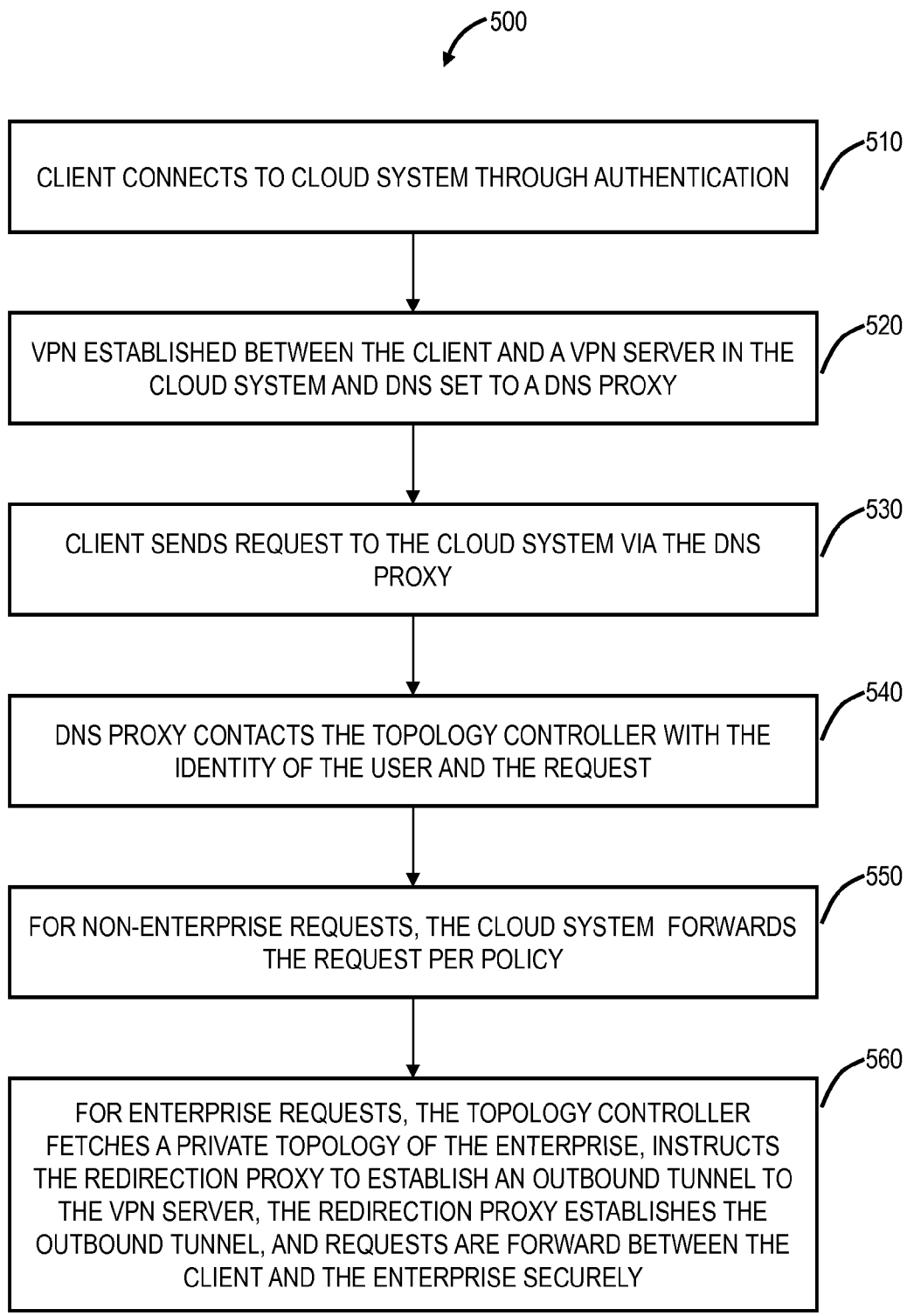
FIG. 5 is a flowchart of a VPN method for an intelligent, cloud-based global VPN.

Referring to FIG. 5, in an exemplary embodiment, a flowchart illustrates a VPN method 500 for an intelligent, cloud-based global VPN. The VPN method 500 can be implemented through the VPN architecture 400. The VPN method 500 includes the client 410 connecting to the cloud system 100 through authentication (step 510). Once the authentication is complete, a VPN is established between the client 410 and a VPN server in the cloud system 100 and DNS for the client 410 is set to a DNS proxy 460 (step 520). Now, the client 410 has a secure VPN connection to the cloud system 100. Subsequently, the client 410 sends a request to the cloud system 100 via the DNS proxy 460 (step 530). Here, the request can be anything—request for the enterprise 404, the Internet 104, the SaaS/public cloud systems 402, etc. The DNS proxy 460 contacts the topology controller 450 with the identity of the user and the request (step 540). That is, whenever the client 410 wishes to reach a destination (Internet, Intranet, SaaS, etc.), it will consult the DNS proxy 460 to obtain the address of the destination.

For non-enterprise requests, the cloud system 100 forwards the request per policy (step 550). Here, the cloud system 100 can forward the request based on the policy associated with the enterprise 404 and the client 410. With the identity of the user and the enterprise they belong to, the VPN server will contact the topology controller 450 and pre-fetch the enterprise private topology. For enterprise requests, the topology controller 450 fetches a private topology of the enterprise 404, instructs the redirection proxy 430 to establish an outbound tunnel to the VPN server, the redirection proxy 430 establishes the outbound tunnel, and requests are forward between the client 410 and the enterprise 404 securely (step 560). Here, the DNS proxy 460 works with the topology controller 450 to determine the local access in the enterprise 404, and the topology controller 450 works with the redirection proxy 430 to dial out a secure connection to the VPN server. The redirection proxy 430 establishes an on-demand tunnel to the specific VPN server so that it can receive packets meant for its internal network.

Global VPN applications

Advantageously, the systems and methods avoid the conventional requirement of VPN tunneling all data into the enterprise 404 and hair-pinning non-enterprise data back out. The systems and methods also allow the enterprise 404 to have remote offices, etc. without requiring large hardware infrastructures—the cloud system 100 bridges the clients 410, remote offices, etc. to the enterprise 404 in a seamless manner while removing the requirement to bring non-enterprise data through the enterprise 404. This recognizes the shift to mobility in enterprise applications. Also, the VPN tunnel on the client 410 can leverage and use existing VPN clients available on the mobile devices 300. The cloud system 100, through the VPN architecture 400, determines how to route traffic for the client 410 efficiently—only enterprise traffic is routed securely to the enterprise 404. Additionally, the VPN architecture 400 removes the conventional requirement of tunneling into the enterprise 404 which can be an opportunity for security vulnerabilities. Instead, the redirection proxy 430 dials out of the enterprise 404.

The systems and methods provide, to the end user (enterprise user), a single, seamless way to connect to Public and Private clouds—with no special steps needed to access one vs. the other. To the IT Admin, the systems and methods provide a single point of control and access for all users—security policies and rules are enforced at a single global, cloud chokepoint—without impacting user convenience/performance or weakening security.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
    connecting to a client at a Virtual Private Network (VPN) device in a cloud-based system;
    forwarding requests from the client for the Internet or public clouds accordingly;
    for requests for an enterprise associated with the client, contacting a topology controller to fetch a topology of the enterprise, causing a tunnel to be established from the enterprise to the VPN device, and forwarding the requests for the enterprise through the tunnel to the cloud-based system for proactive monitoring; and
    providing a secure connection from the cloud-based system back to the enterprise, including internal domain and subnets associated with the enterprise.

2. The method of claim 1, further comprising:
    authenticating, via an authentication server, the client prior to the connecting and associated the client with the enterprise.

3. The method of claim 1, further comprising:
    subsequent to the connecting, setting a Domain Name Server (DNS) associated with the cloud system to provide DNS lookups for the client.

4. The method of claim 3, further comprising:
    utilizing the DNS to determine a destination of the requests; and
    for the requests for the enterprise, contacting the topology controller to pre-fetch the topology of the enterprise.

5. The method of claim 1, further comprising:
    operating an on-premises redirection proxy within the enterprise, wherein the on-premises redirection proxy is configured to establish the tunnel from the enterprise to the VPN device.

6. The method of claim 5, wherein secure tunnels to the enterprise are dialed out from the enterprise by the on-premises redirection proxy.

7. The method of claim 5, wherein the on-premises redirection proxy is a virtual machine operating behind a firewall associated with the enterprise.

8. The method of claim 5, wherein the on-premises redirection proxy is configured as a bridge between the client and applications inside the enterprise.

9. The method of claim 1, wherein the VPN device operates on a cloud node in the cloud system, and wherein the cloud system comprises a distributed security cloud.

10. The method of claim 1, wherein the VPN device comprises one of a software instance on a cloud node or a virtual machine on the cloud node.

11. The method of claim 1, wherein the topology controller comprises a network topology of the enterprise comprising internal domain names and subnets.

12. A cloud system, comprising:
    one or more Virtual Private Network (VPN) implemented through a server, wherein one or more clients connect securely to the one or more VPN servers;
    a topology controller communicatively coupled to the one or more VPN servers;
    a Domain Name Server (DNS) communicatively coupled to the topology controller and the one or more VPN servers; and
    a redirection proxy located in a private network implemented through a server and communicatively coupled to the one or more VPN servers and the topology controller;
    wherein requests from the one or more clients to the private network cause on demand secure connections being established by the redirection proxy to associated VPN servers in a cloud-based system, wherein the on demand secure connections provide connectivity to the private network including internal domain and subnets associated with the private network, and wherein the cloud-based system performs proactive monitoring.

13. The cloud system of claim 12, wherein requests from the one or more clients outside of the private network are forwarded without traversing the private network.

14. The cloud system of claim 12, wherein the redirection proxy maintains a persistent connection to the topology controller and establishes secure tunnels to the one or more VPN servers based on direction from the topology controller.

15. The cloud system of claim 12, wherein the topology controller comprises a network topology of the private network comprising internal domain names and subnets.

16. The cloud system of claim 12, wherein the VPN servers operate on cloud nodes in a distributed security cloud.

17. A Virtual Private Network (VPN) system, comprising:
    a network interface, a data store, and a processor, each communicatively coupled together; and
    memory storing instructions that, when executed, cause the processor to:
        establish a secure tunnel with a client;
        forward requests from the client to the Internet accordingly; and
        for requests to an enterprise, contact a topology controller to fetch a topology of the enterprise, cause a tunnel to be established from the enterprise to the VPN system, and forwarding the requests for the enterprise through the tunnel and the secure tunnel, wherein the secure tunnel is achieved by using an on-demand dial-out and tunneling traffic authentication.

18. The VPN system of claim 17, wherein the memory storing instructions that, when executed, further cause the processor to:
    cause the tunnel to be established from the enterprise to the VPN system through an on premises redirection proxy located within the enterprise to a cloud-based system for proactive monitoring.

* * * * *